March 12, 1946.   A. W. BORSUM   2,396,244
360° RESISTANCE TYPE TRANSMITTER
Filed Dec. 30, 1943   2 Sheets-Sheet 1

INVENTOR
Adolph W. Borsum
BY
ATTORNEY

Patented Mar. 12, 1946

2,396,244

UNITED STATES PATENT OFFICE 2,396,244

360° RESISTANCE TYPE TRANSMITTER

Adolph W. Borsum, United States Navy

Application December 30, 1943, Serial No. 516,185

6 Claims. (Cl. 177—380)

(Granted under the act of March 3, 1883, as amended April 30, 1928; 370 O. G. 757)

This invention relates to telemetric systems which are used in repeating at one or more distant points the operation of a master instrument, the latter being commonly known as a transmitter.

The general object of the invention is to provide an improved transmitter element for use in a telemetric system of the character described which is simple in construction, inexpensive to manufacture, light in weight, highly accurate and dependable in operation.

Another object is to provide an improved transmitter for telemetering to a remote location, angular variations of the transmitter through 360°.

Still another object is to provide an electrical telemetric angle transmitter which produces at its output terminals a pair of electrical potentials, the ratio of which varies as the tangent function of the angle transmitted.

A more specific object of the invention is to provide a transmitter of the character described including four resistance legs connected together in the form of a square, a contact arm mounted on an axis through the geometrical center of the square, means for producing relative rotation between the square and arm on the axis, and a source of potential connected across the points of contact between the arm and resistance legs whereby the ratio of the potential produced across one pair of diagonals of the square to the potential produced across the other pair of diagonals will vary as the tangent function of the angle formed by the relative rotation between the arm and square.

These and other objects of the invention will become more apparent from the detailed description to follow and from the accompanying drawings which illustrate preferred embodiments of the invention.

The transmitter which is presently to be described is designed in particular for use with the highly accurate telemetric repeater shown and described in my co-pending application, Ser. No. 452,545, filed July 27, 1942. However, the transmitter may be used with other types of repeaters in which the position of the repeating element thereof is determined by the angle of the resultant flux produced by current transversing the coils of the repeater, such as for example, the crossed coil arrangement illustrated and described in U. S. Patent No. 1,162,475, issued to G. H. Gibson on November 30, 1915.

Figure 1:
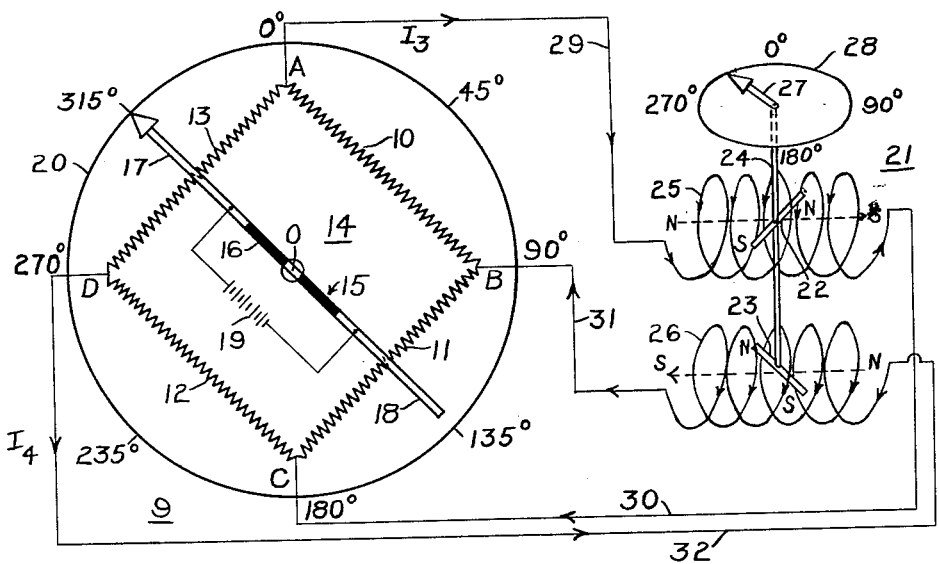
Fig. 1 is a combined diagrammatic and schematic illustration of one embodiment of my invention.

Referring now to Fig. 1, my improved transmitter instrument which is indicated as a whole by the reference numeral 9 comprises four straight resistance legs 10, 11, 12 and 13. These legs are connected together at their ends and are arranged in the form of a square 14. All four of these legs should have identical electrical characteristics. That is to say, all of them should have the same value of resistance per unit of length.

Mounted for rotation by any suitable bearing supporting means (not shown), the axis of which is positioned at the geometric center O of square 14, is an arm 15 which is adapted to make sliding contact with all points along oppositely disposed resistance legs 10—12 and 11—13 of the square. The arm 15 includes non-conductive central portions 16 and conductive end portions 17 and 18.

A suitable source of potential such as a battery 19 is connected in circuit with the end portions 17 and 18 of arm 15.

A reference plate 20 having angle indicia inscribed thereon is provided and is so arranged relative to the square 14 that the four corners of the square are coincident with the cardinal points on the plate 20, i. e., 0°, 90°, 180° and 270°.

A repeater instrument 21 located remotely from the transmitter 9 for repeating any angular variation of the transmitter is fully described in the aforementioned co-pending application. Accordingly, only the fundamental elements of the instrument are shown here in order to permit a full explanation of a complete telemetric system in which my improved transmitter claimed in this application may be used.

The repeater 21 comprises two equally magnetized bar magnets 22 and 23 each supported on a common shaft 24 so that their axes form an angle of 90° with each other. The magnets 22 and 23 are spaced along the shaft 24 so that each may be completely enclosed within coils 25, 26, respectively.

A pointer 27 is fixed to the upper end of shaft 24 and rotates therewith relative to a fixed ring 28 upon which angle indicia may be inscribed.

The flux H produced in each of the coils 25, 26 by the current therein acts upon magnet members 22 and 23, respectively, tending to produce rotation of each magnet about its axis. The moment of force acting on each magnet is equal to:

$$\text{Couple}_1 = ml \cos \theta_1$$

$$\text{Couple}_2 = ml \cos (90 - \theta_1)$$

where $l=$ length of a magnet having a pole strength $m$ and $\theta_1$ is the angle of inclination of the magnet with the plane of the coil associated therewith.

Since the couples are equal, $$\frac{H_1}{H_2} = \frac{\cos(90-\theta_1)}{\cos \theta_1} = \frac{\sin \theta_1}{\cos \theta_1} \text{ or } \tan \theta_1$$

Since the field intensity H of each coil 25 and 26 is proportional to its current, the magnets and hence pointer 27 may be made to rotate through 360° by varying the potentials impressed on the coils and hence the currents through the coils so that their ratio always equals the tangent function of the angle generated and are in the proper direction for each of the four quadrants.

Coil 25 is connected to one pair of diagonals AC of the resistance square 14 by conductors 29 and 30. Similarly coil 26 is connected to the other pair of diagonals BD by conductors 31 and 32.

When arm 15 is in the 315° position as shown in Fig. 1, the resistance through the portions of resistance legs 11, and 13 in circuit between the battery 19 and coil 25 is equal to the resistance through the portions of legs 11, 13 in circuit between battery 19 and coil 26. Thus the potential drop across diagonal AC of the square 14 causes a current $I_3$ to flow through coil 25 in the direction indicated on the drawings and the potential drop across diagonal BD causes an equal current $I_4$ to flow through coil 26 in the direction indicated. Hence the pointer 27 of the repeater will also take a position at the 315° mark.

As the arm 15 moves from the 315° position towards the 0° position, the ratio of currents $I_3$, $I_4$ will vary as the tangent function of the angle generated until at 0°, current $I_3$ will be at a maximum and current $I_4$ will have decreased to zero.

Pointer 27 of the repeater will likewise indicate 0° since coil 25 is then the only one carrying current and thus magnet 22 will take a position parallel with the coil axis.

As arm 15 moves clockwise past the 0° position, current $I_3$ will decrease from its maximum value and current $I_4$ will increase from its zero value until at the 45° position, both currents $I_3$ and $I_4$ will again be equal. However, current $I_4$ will now be in a direction opposite to that indicated on the drawings, and pointer 27 will take the 45° position.

In a like manner, the same current variations take place for each succeeding 90° interval and thus pointer 27 will accurately follow the angle variation of the arm 15 throughout a complete circle since the ratio of currents $I_3$, $I_4$ will always vary as the tangent function of the angle through which arm 15 is rotated.

It will be evident that the same result will be obtained if arm 15 is made stationary and the resistance square 14 rotated on an axis through its center O.

Figure 2:
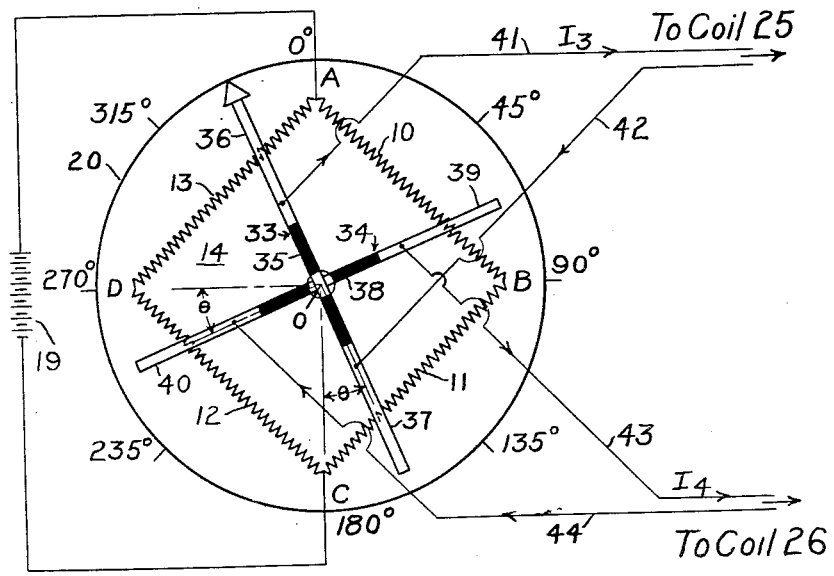
Fig. 2 is a modification of the device shown in Fig. 1.

Reference is now made to Fig. 2 of the drawings which show a modification of the device illustrated in Fig. 1. Where applicable, like reference numerals have been applied to Fig. 2 to designate like parts which appear in Fig. 1.

The structure in Fig. 2 differs from the arrangement shown in Fig. 1 in that instead of utilizing a single arm rotatable relative to the resistance square 14, a pair of arms 33, 34 set at right angles to each other are employed.

Arm 33 contains central non-conductive portions 35 and conductive end portions 36 and 37. Similarly, arm 34 includes a central non-conductive portion 38 and conductive end portions 39 and 40.

In Fig. 1, battery 19 was connected to the conductive end portions of arm 15 but in Fig. 2, battery 19 is connected across one pair of diagonals such as A and C of the resistance square 14.

Coil 25 is connected through conductors 41 and 42 to the end portions 36 and 37 of arm 33 and coil 26 is connected to the end portions 39 and 40 of arm 34.

In operation, arms 33 and 34 rotate as a unit over the legs of the resistance square 14 and in so doing vary the currents through coils 25 and 26 in a ratio equal to the tangent function of the angle through which the arms 33 and 34 are moved. Thus pointer 27 will repeat the position of the arm.

As in Fig. 1, it will be evident that the same result can be obtained by keeping arms 33 and 34 fixed and rotating square 14 on an axis through its center O.

Figure 3:
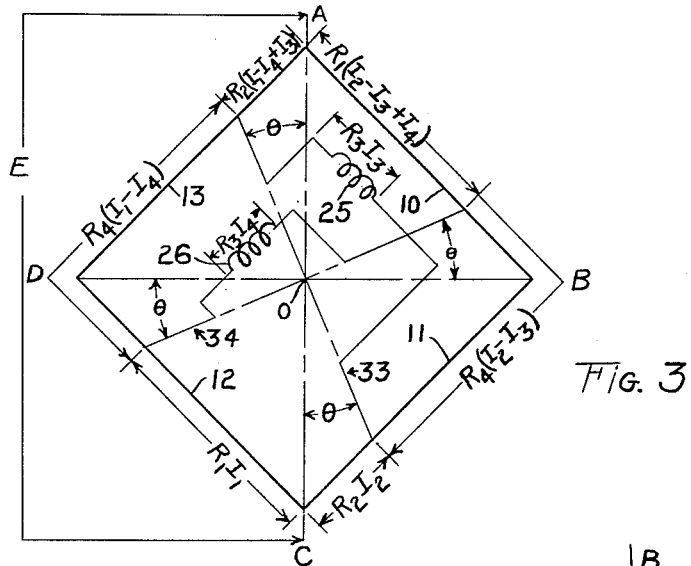
Figs. 3 and 4 are mathematical and geometric representations, respectively, of the fundamental formulas and circuits involved in the operation of the transmitter illustrated in Fig. 2.
Figure 4:
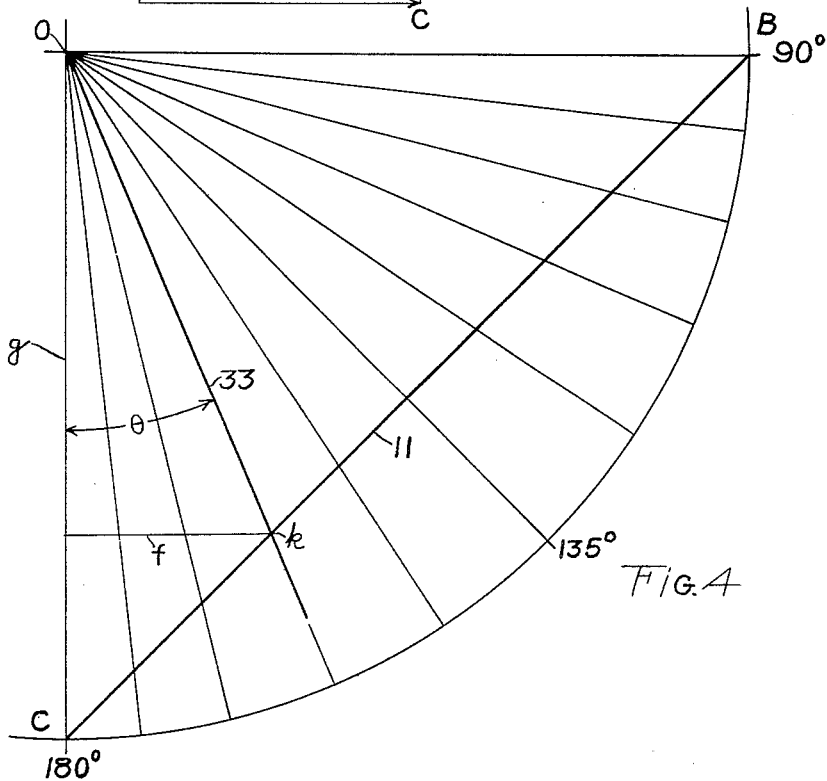

The fact that the ratio of currents $I_3$, $I_4$ varies as the tangent function of such angle will be evident from Figs. 3 and 4.

Reference is now made to Fig. 3 which shows the various electrical circuits present in the arrangement illustrated in Fig. 2.

By Kirchhoff's laws for networks, the following equations are derived from the various current paths in Fig. 3:

1.
$$E = R_1 I_1 + R_4 I_1 - R_4 I_4 + R_2 I_1 - R_2 I_3 + R_2 I_3$$
$$E = I_1(R_1 + R_2 + R_4) + R_2 I_3 - I_4(R_2 + R_4)$$
$$I_1 = \frac{E - R_2 I_3 + I_4(R_2 + R_4)}{R_1 + R_2 + R_4}$$

2.
$$E = R_2 I_2 + R_4 I_2 - R_4 I_3 + R_1 I_2 - R_1 I_3 + R_1 I_4$$
$$E = I_2(R_1 + R_2 + R_4) + R_1 I_4 - I_3(R_4 + R_1)$$
$$I_2 = \frac{E - R_1 I_4 + I_3(R_4 + R_1)}{R_1 + R_2 + R_4}$$

3.
$$E = R_1 I_1 + R_3 I_3 + R_1 I_2 - R_1 I_3 + R_1 I_4$$
$$E = R_1 I_1 + I_4(R_3 + R_1) + R_1 I_2 - R_1 I_3$$

4.
$$E = R_2 I_2 + R_3 I_3 + R_2 I_1 - R_2 I_4 + R_2 I_3$$
$$E = R_2 I_2 + I_3(R_3 + R_2) + R_2 I_1 - R_2 I_4$$

By substituting Equations 1 and 2 in Equation 3, as follows, Equation 5 below is derived:

3.
$$E = R_1 I_1 + R_1 I_2 - R_1 I_3 + I_4(R_3 + R_1)$$
$$E = R_1 \left[ \frac{E - R_2 I_3 + I_4(R_2 + R_4)}{R_1 + R_2 + R_4} \right] + R_1 \left[ \frac{E - R_1 I_4 + I_3(R_4 + R_1)}{R_1 + R_2 + R_4} \right] -$$
$$R_1 I_3 + I_4(R_3 + R_1)$$
$$E(R_1 + R_2 + R_4) = R_1 E - R_1 R_2 I_3 + I_4(R_1 R_2 + R_1 R_4) + R_1 E - R_1^2 I_4 +$$
$$I_3(R_1 R_4 + R_1^2) - R_1^2 I_3 - R_1 R_2 I_3 - R_1 R_4 I_3 + I_4(R_3 + R_1)(R_1 + R_2 + R_4)$$
$$E(R_1 + R_2 + R_4) = 2R_1 E - I_3[R_1 R_2 - (R_1 R_4 + R_1^2) + R_1^2 + R_1 R_2 + R_1 R_4] +$$
$$I_4[(R_1 R_2 + R_1 R_4) - R_1^2 + (R_3 + R_1)(R_1 + R_2 + R_4)]$$
$$0 = -E(-R_1 + R_2 + R_4) - I_3[2 R_1 R_2 - R_1 R_4 - R_1^2 + R_1^2 + R_1 R_4] +$$
$$I_4[R_1 R_2 + R_1 R_4 - R_1^2 + R_3 R_1 R_1^2 + R_3 R_2 + R_1 R_2 + R_3 R_4 + R_1 R_4]$$

5.
$$0 = -I_3(2 R_1 R_2) + I_4(2 R_1 R_2 + 2 R_1 R_4 + R_1 R_3 + R_2 R_3 + R_3 R_4) -$$
$$E(-R_1 + R_2 + R_4)$$

By substituting Equations 1 and 2 in Equation 4, as follows, Equation 6 below is derived.

4. $$E = R_2I_3 + I_3(R_3+R_2) + R_1I_1 - R_2I_4$$

$$E = R_2\left[\frac{E - R_1I_4 + I_3(R_4+R_1)}{R_1+R_2+R_4}\right] + I_3(R_3+R_2) - R_2I_4 +$$

$$R_2\left[\frac{E - R_2I_3 + I_4(R_2+R_4)}{R_1+R_2+R_4}\right]$$

$$E(R_1+R_2+R_4) = R_2E - R_1R_2I_4 + I_3(R_2R_4+R_1R_3) + I_3(R_1R_3+R_1R_2 + R_2R_3+R_2{}^2+R_3R_4+R_2R_4) - I_4(R_1R_2+R_2{}^2+R_2R_4) + R_2E - R_2{}^2I_3 + I_4(R_2{}^2+R_2R_4)$$

$$E(R_1+R_3+R_4) = 2R_2E + I_3[R_2R_4+R_1R_2+R_1R_3+R_1R_2+R_2R_3+R_2{}^2+R_3R_4+R_2R_4-R_2{}^2] - I_4(R_1R_2+R_1R_2+R_2{}^2+R_2R_4-R_2{}^2-R_2R_4)$$

6. $$0 = -I_4(2R_1R_2) + I_3(2R_2R_4+2R_1R_2+R_1R_3+R_2R_3+R_3R_4) - E(R_1-R_2+R_4)$$

Reference is now made to Fig. 4 which shows resistance leg 11 lying between the 90° and 180° positions. Let it be assumed that the total resistance of leg 11 equals 100 units and is divided into 10 equal lengths of 10 units each.

Let it further be assumed that arms 33 and 34 occupy the positions shown in Fig. 2 in which position arm 33 forms an angle $\theta$ with a line through diagonals AC and arm 34 likewise forms the same angle $\theta$ with a line through diagonals BD.

Thus graphically from Fig. 4 (which shows only arm 33) tangent $$\theta = \frac{f}{g} = .428$$

and thus $\theta = 23.2°$.

Now since it was assumed that the whole resistance leg 11 has a value of 100 units, it is evident from Fig. 4 that the resistance between C and $k$ is 30 units and the resistance between $k$ and B is (100—30) or 70 units.

Thus in the corresponding electrical circuit diagram of Fig. 3, $R_1 = 70$ units
$R_2 = 30$ units
$R_3 = $ the resistance of coils 25 and 26, and
$R_4 = 100$ units.

Substituting the values $R_1$, $R_2$ and $R_4$ and any assumed value for $R_3$ and E in Equations 5 and 6, and solving for $I_3$ and $I_4$, it will be found that $$\frac{I_4}{I_3} = \frac{.211}{.493}$$

or .428 which agrees with the geometric analysis in Fig. 4 where tangent of angle $\theta$ was also found to be .428.

A similar mathematical and geometrical check for the embodiment shown in Fig. 1 also will prove that the ratio of currents $I_3I_4$ varies as the tangent function of the angle generated.

In conclusion it will be evident that certain changes other than these already described may be made by those skilled in the art without departing from the spirit and scope of the invention as defined by the appended claims.

The invention described herein may be manufactured and used by or for the Government of the United States of America for governmental purposes without the payment of any royalties thereon or therefor.

Having thus fully described my invention, I claim:

1. A telemetric transmitter comprising four resistance legs connected in the form of a square, an arm, means for mounting said arm for rotation on an axis through the geometrical center of said square, said arm including conductive end portions insulated from each other in contact with opposite legs of said square, and a source of potential connected across the points of contact between the end portions of said arm and said legs whereby the ratio of the potential produced across one pair of diagonals of said square to the potential produced across the other pair of diagonals will vary as the tangent function of the angle generated by rotation of said arm.

2. A telemetric transmitter comprising four resistance legs connected together in the form of a square, an arm, means for mounting said arm on an axis through the geometric center of said square, said arm including conductive end portions insulated from each other in contact with opposite legs of said square, means for producing relative rotation between said square and arm on said axis, and a source of potential connected across the points of contact between the end portions of said arm and said legs whereby the ratio of the potential produced across one pair of diagonals of said square to the potential produced across the other pair of diagonals will vary as the tangent function of the angle generated by such relative rotation.

3. A telemetric transmitter comprising four resistance legs connected in the form of a square, a pair of arms, said arms being fixed at right angles and including conductive end portions insulated from each other, means for mounting said arms for rotation on an axis through the center of said square with the end portions of said arms in contact with opposite legs of said square, and a source of potential connected across diagonally opposite corners of said square whereby the ratio of potentials obtained across the end portions of each of said arms will vary as the tangent function of the angle through which said arms are rotated.

4. A telemetric transmitter comprising four resistance legs connected in the form of a square, a pair of arms, said arms being fixed at right angles and including conductive end portions insulated from each other, means for mounting said arms on an axis through the center of said square with the end portions of each arm in contact with opposite legs of said square, a source of potential connected to diagonally opposite corners of said square, and means for obtaining relative rotation on said axis between said arms and square whereby the ratio of potentials obtained across the end portions of each of said arms will vary as the tangent function of the angle generated by said relative rotation.

5. A telemetric transmitter comprising resistance legs connected to form a square, an arm, means for mounting said arm on an axis through the center of said square, said arm including contact means adapted to make contact with opposite legs of said square, a source of potential, means for connecting said source of potential in circuit with said square to obtain potential drops across said resistance legs, and means for obtaining relative rotation between said square and said arm on said axis whereby a pair of output potentials, the ratio of which varies as the tangent function of the angle generated by said relative rotation, is obtained across the portions of said resistance legs in circuit respectively between said source of potential and said contact means.

6. A telemetric transmitter comprising resistance legs arranged to form a square, contact means adapted to make contact with opposite legs of said square, support means for said contact means, a source of potential, means for connecting said source of potential in circuit with said square to obtain potential drops across said resistance legs and means for obtaining relative rotation between said square and said support means on an axis through the center of said square to cause said contact means to traverse opposite legs of said square whereby a pair of output potentials, the ratio of which varies as the tangent function of the angle generated by said relative rotation, is obtained across the portions of said resistance legs in circuit respectively between said source of potential and said contact means.

ADOLPH W. BORSUM.